April 25, 1933.  H. A. GREENHOLT  1,905,701
CONVEYING MECHANISM
Filed Feb. 21, 1925   5 Sheets-Sheet 1

INVENTOR
Harry A Greenholt
BY
Mayer, Warfield and Watson
ATTORNEYS

April 25, 1933. H. A. GREENHOLT 1,905,701
CONVEYING MECHANISM
Filed Feb. 21, 1925 5 Sheets-Sheet 2

INVENTOR
Harry A. Greenholt
BY
Mayer Warfield and Watson
ATTORNEYS

April 25, 1933.  H. A. GREENHOLT  1,905,701
CONVEYING MECHANISM
Filed Feb. 21, 1925  5 Sheets-Sheet 3

April 25, 1933.  H. A. GREENHOLT  1,905,701
CONVEYING MECHANISM
Filed Feb. 21, 1925   5 Sheets-Sheet 4

INVENTOR
Harry A. Greenholt
BY
Mayer, Warfield and Watson
ATTORNEYS

April 25, 1933.  H. A. GREENHOLT  1,905,701
CONVEYING MECHANISM
Filed Feb. 21, 1925   5 Sheets-Sheet 5

INVENTOR
Harry A. Greenholt
BY
Mayer, Warfield and Watson
ATTORNEYS

Patented Apr. 25, 1933

1,905,701

UNITED STATES PATENT OFFICE

HARRY A. GREENHOLT, OF CHICAGO, ILLINOIS, ASSIGNOR TO NATIONAL BISCUIT COMPANY, OF NEW YORK, N. Y., A CORPORATION OF NEW JERSEY

CONVEYING MECHANISM

Application filed February 21, 1925. Serial No. 10,720.

This invention relates to an improved form of material-conveying machine and is particularly intended for use in the baking industry as a panskip mechanism.

It is an object of the invention to provide a machine of this character the individual parts of which will be comparatively few in number and simple and rugged in construction, providing, when assembled, a machine operating over long periods of time, with freedom from mechanical difficulty and with a minimum of attendance, and transferring a maximum number of articles, for example, crackers, cookies, etc., from a conveyor to pans within a minimum amount of time.

It is a further object to provide a machine of this character in which the articles being handled will be transferred into the pans with freedom from mutilation and wastage, and the machine having its several parts adjustable relatively to each other to assure a depositing of the articles into the pans in a predetermined relationship.

An additional object is that of providing a mechanism which will efficiently perform the purposes for which it is intended, and which will also be economically and readily manufactured and easily assembled.

Other objects of the invention will in part be obvious and will in part appear hereinafter.

The invention accordingly comprises the features of construction, combination of elements and arrangement of parts, which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Fig. 6 is a transverse sectional view taken through the machine and toward the pannerblade thereof;

In view of the fact that the present invention, although capable of being adapted to numerous different purposes, is particularly intended for use in the baking industry, and specifically, for use as a panskip mechanism, the illustrated embodiment has been confined to such a showing. The mechanism by means of which, in the present instance, the material would be cut and embossed or otherwise treated, and which mechanism would appear to the left of Figs. 1 and 2, has been accordingly omitted.

Figure 1:
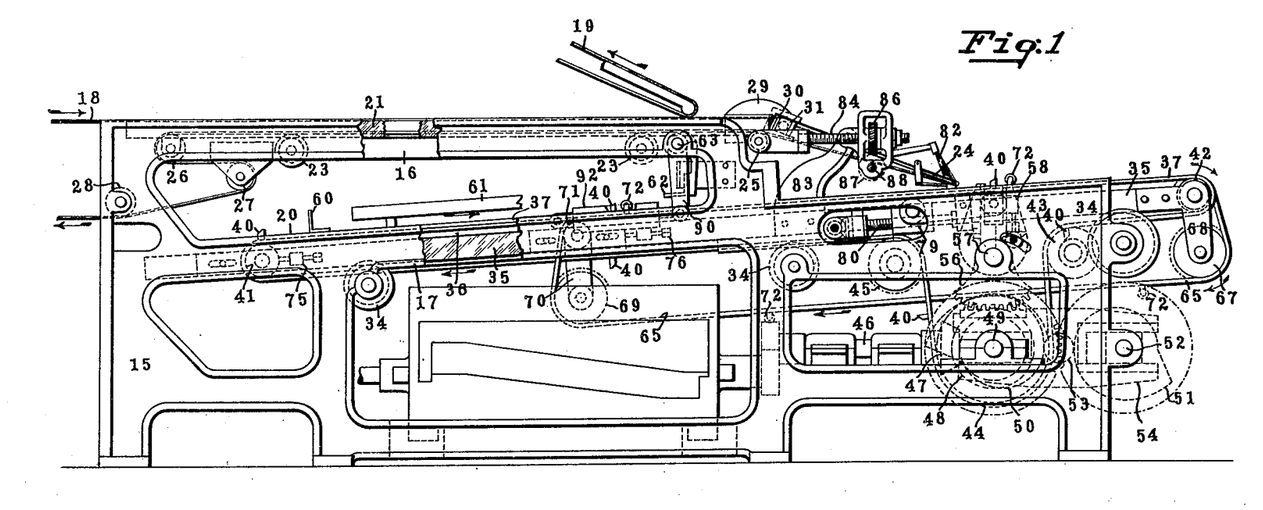
Fig. 1 is a side elevation of one form of machine embodying an example of the present invention and having certain of the exterior portions broken away to disclose the underlying construction.
Figures 2, 7:
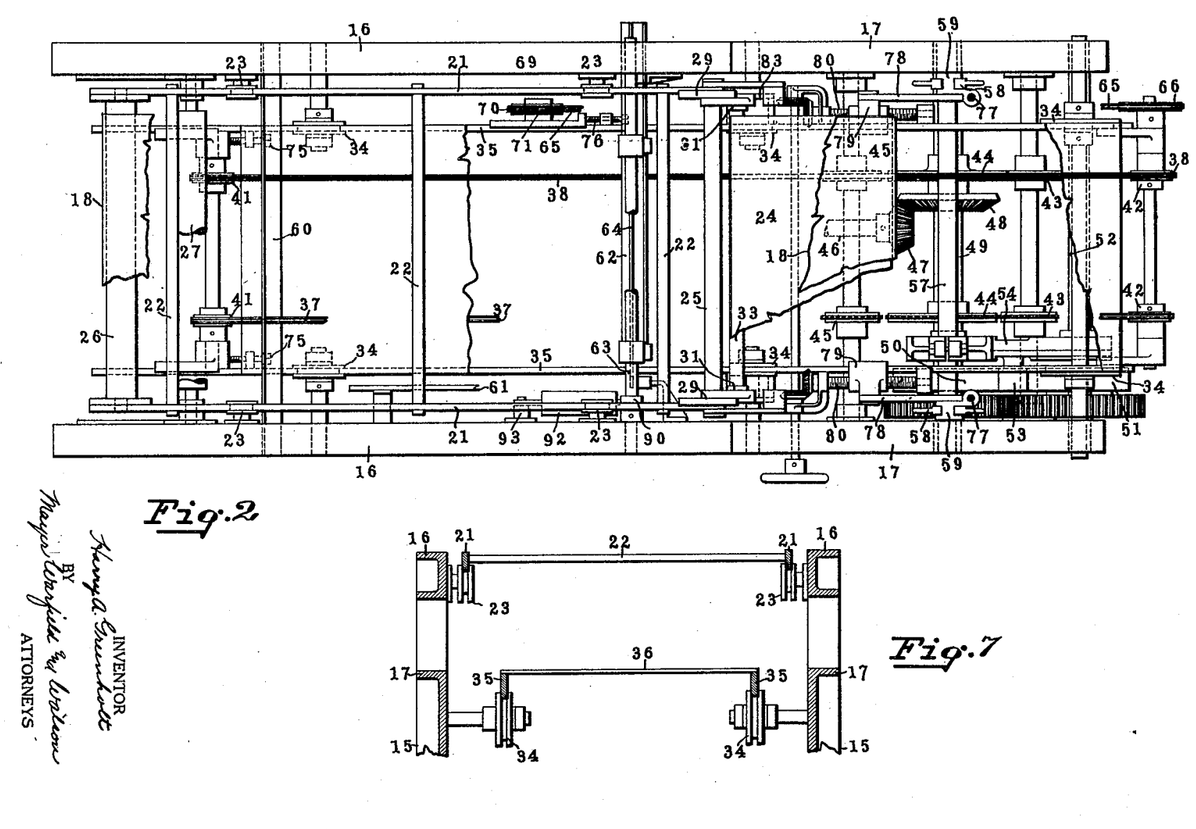
Fig. 2 is a plan view of the machine as shown in Fig. 1, with certain of the parts removed.
Fig. 7 is a sectional view showing certain details of the conveyor mountings.

Thus, with particular reference to these figures it will be noted that the machine includes a frame 15 having portions 16 and 17 which constitute upper and lower decks, and conveyors 18 and 20 have their supporting surfaces moving in planes in line with these decks. In the present instance the first of these conveyors serves to transport the material, i. e., a layer of dough, while the lastnamed conveyor carries the pans which are to receive this material. As previously brought out, the layer is usually cut and embossed, so that surplus material exists, and in order to remove this surplusage a conveyor 19 may be provided, to which one end of the web of waste material is attached. This conveyor moving in substantial synchronism with the conveyor 18 will thus serve to lift all material other than that which is to be deposited within the pans from the face of the conveyor 18, and the removed material may, of course, be returned to a mechanism by which it is reworked and again utilized.

Figures 3, 9:
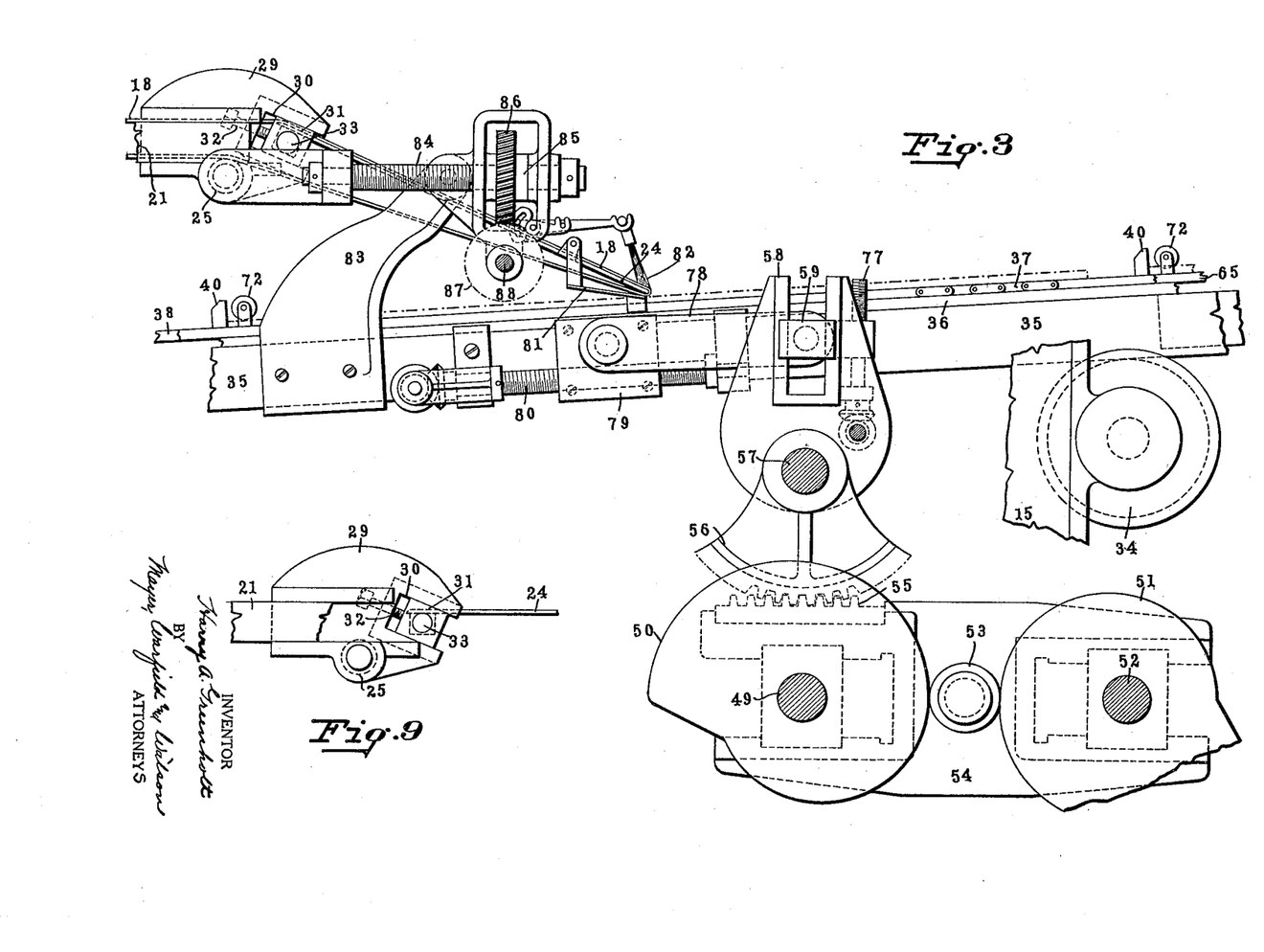
Fig. 3 is an enlarged fragmentary side elevation of a part of the mechanism as shown in Fig. 1.
Fig. 9 is a fragmentary side view of the panner-blade-supporting mechanism.
Figure 4:
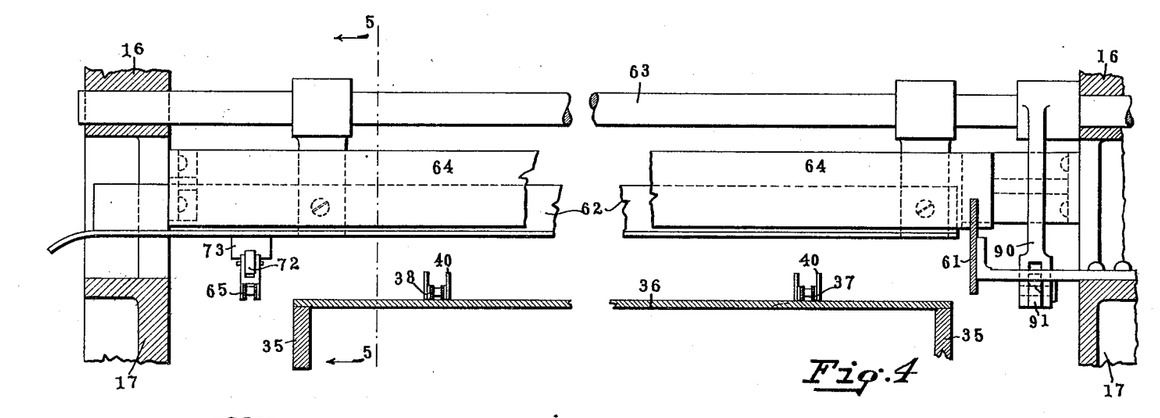
Fig. 4 is a transverse sectional view of the machine and showing the pan-delivering mechanism.
Figures 5, 10:
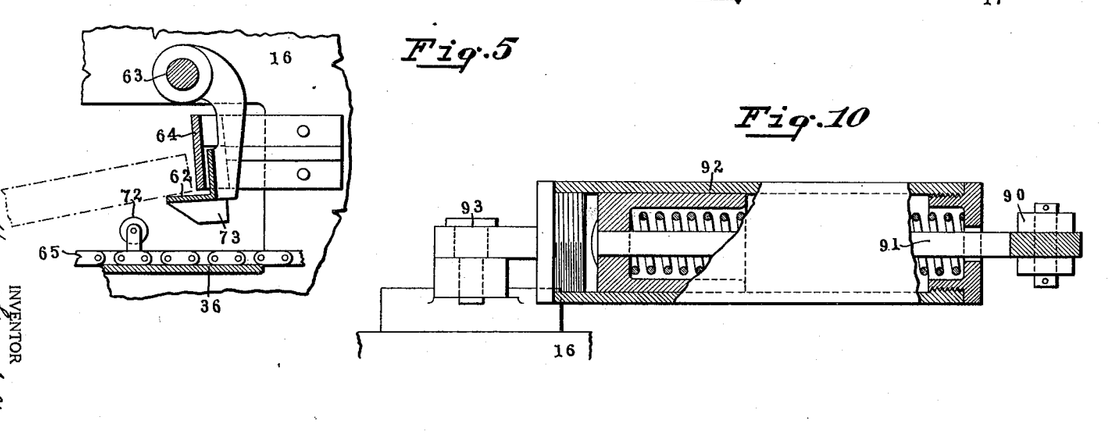
Fig. 5 is a fragmentary sectional side view taken along the lines 5—5 and in the direction of the arrows indicated in Fig. 4.
Fig. 10 is a partly sectional, fragmentary view of the trigger-actuating mechanism.
Figure 6:
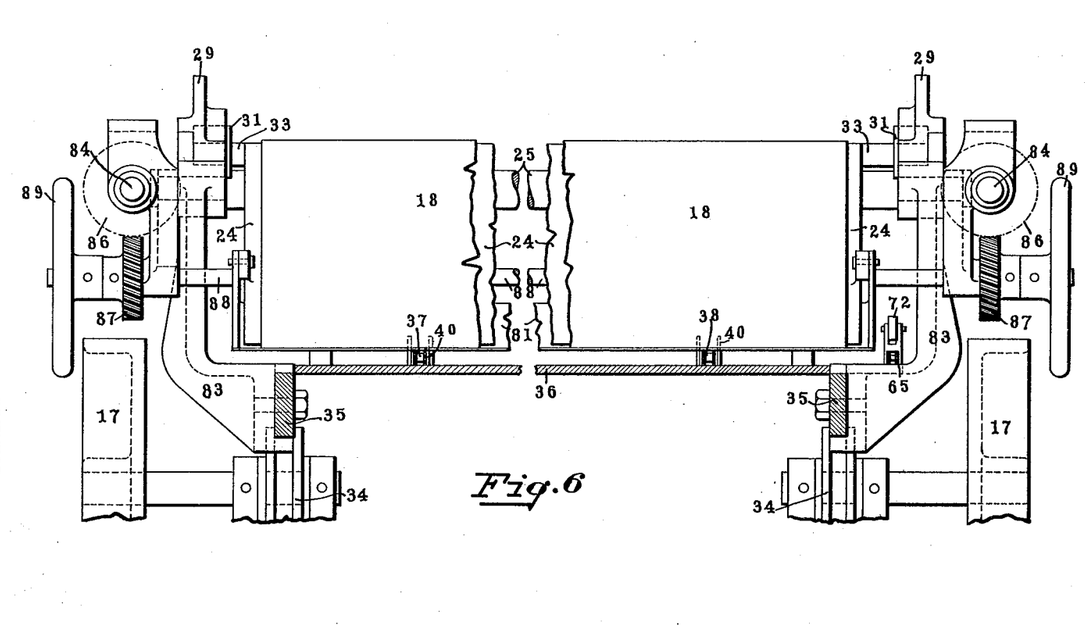
Figure 8:
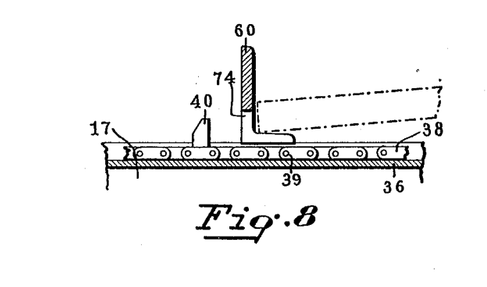
Fig. 8 is a fragmentary sectional side view of a portion of the pan conveyor.

The conveyor 18, or as it is usually called, the dough apron, is a continuously driven endless belt, which at its forward end runs over the free edge of a plate or panner blade 24 and returns, on its lower run, over rollers 25, 26, as is clearly shown in Figs. 1 and 3. The forward end of the apron 18 terminates over the conveyor or pan carrier 20, which is formed from a pair of parallel endless chains 37, 38 (Figs. 4, 5, 6, 8), and carries the pans or receptacles for receiving the biscuit, or other articles as they are delivered from the apron passing around the edge of the panner blade 24, as will presently be more fully described.

Figure 11:
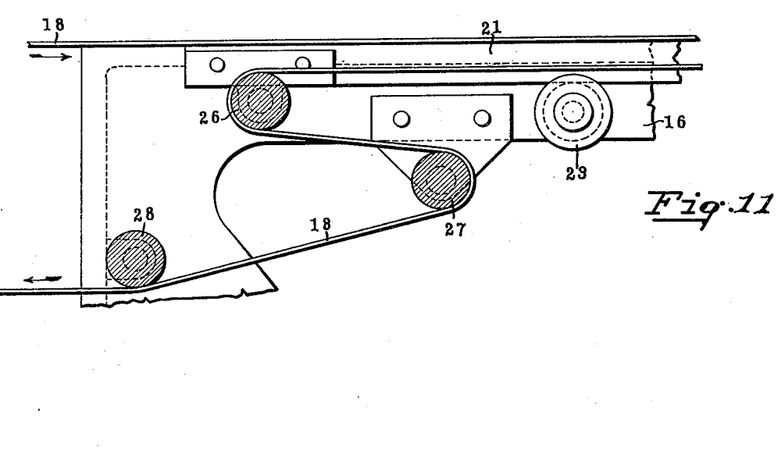
Fig. 11 shows the manner in which the body of the dough-conveying belt is mounted.

The conveyor 18 has the greatest part of its body, as well as its delivery end, supported upon a carriage, which is shown to best advantage in Figs. 1 and 3. This carriage includes a pair of rails 21 connected together by cross-bars 22, the rails being movable longitudinally of the frame 15 to which end they rest within the grooves of rollers 23 rotatably supported on the inner face of the portion 16 thereof. A plate 24 is supported adjacent the forward end of the carriage provided by this structure, and is adjustable relatively thereto in a manner hereinafter specified, it being noted, as has been shown in Figs. 3 and 11, that a roller 25 is provided adjacent the forward end of the carriage, and that a second roller 26 is provided adjacent the rear end of the same,—both of these rollers acting as guides and supports for the conveyor 18 and being attached to the carriage. At a point short of the roller 26 the frame of the machine, and, more particularly, the portion 16 thereof, carries a bracket which supports a roller 27, and at a point beyond, and preferably below, the roller 26 a still further roller 28 is supported by the frame of the machine. Thus, as has been clearly shown in the figures previously referred to, as well as in Fig. 1, the conveyor 18, which in the present exemplification is in the nature of a belt, passes over the bars 22, the upper surface and forward edge of the panner-blade or plate 24, rearwardly over the rollers 25 and 26, turns upon itself to pass around the roller 27, and thence passes under the roller 28, it being understood that suitable driving mechanism is employed for the belt 18, and that the latter is endless and passes at its rear end over a roller not shown.

With a view to securing the plate 24 to the carriage provided by the rails 21 and bars 22, it is preferred that this carriage have blocks 29 adjacent its point of connection with the plate 24. These blocks are each provided with slots 30 in their outer ends, and travelers 31 ride within these slots which constitute guideways therefor. The travelers may be adjusted and retained in any desired position by utilizing, for example, set-screws 32, which have their threaded shanks in engagement with similarly threaded openings in the blocks 29, their outer ends being associated with the travelers 31, and the latter rotatably carrying a shaft 33, to which the plate 24 is attached. Thus, the plate may swing relatively to the carriage, as in Figs. 3 and 9, and may be moved towards or away from the same, for a purpose hereinafter brought out.

With reference to that mechanism which in the present instance serves to convey the pans, it will be observed that, similarly to the carriage mounting the upper conveyor, a carriage is provided for the conveyor 20. More particularly, it is preferred that grooved pulleys 34 be rotatably supported adjacent the deck 17 of the machine, and that within the grooves of these pulleys rails 35 be mounted for movement longitudinally of the frame 15. However, instead of utilizing cross-bars, as in the case of the upper carriage, a plate 36 is employed to connect the bars 35 with each other, this plate serving as a deck for the support of the conveyor.

With reference to the conveyor 20 it will be observed that contrary to the belt structure which is associated with the upper deck of the machine this conveyor, as, for example, in Figs. 4, 5, 6 and 8, may include a pair of spaced chains 37 and 38, each embracing a series of interconnected links 39, it being noted that at certain points in the length of this conveyor lugs 40 are associated therewith. The chains constituting this conveyor may be moved in any manner desired, but it is preferred that they pass over rotatably-mounted sprockets 41 adjacent the rear end of the deck 17 over the deck 36, around the similarly-mounted sprockets 42 adjacent the forward end of the deck, and thence, over pairs of sprockets 43, 44 and 45, it being understood that sprockets 41 and 42 are supported by the carriage, of which the rails 35 form a part, while the pairs of sprockets 43, 44 and 45 are associated with the frame 15 of the machine.

Now with a view to moving the conveyor which in the present instance serves to carry the pans, it will be observed, as in Fig. 2, that a power shaft 46 may be provided, which shaft has a gear 47 meshing with the gear 48 carried by the shaft 49, which latter extends transversely of the machine frame. It is this shaft which serves to carry the sprockets 44, and thus, the conveyor provided by the chains 37 and 38 will be moved when the shaft 46 is rotating.

In addition to moving the conveyor, the drive aforedescribed serves to actuate the carriage over which the conveyor moves. This may be accomplished by associating a cam 50 with the shaft 49 and securing a complementary cam 51 to a shaft 52 carried by the frame 15, these shafts being connected to move in synchronism. Disposed between these cams and adapted to be acted upon thereby is a roller 53, which is supported by a carriage 54 mounted for slidable movement longitudinally of the main frame. Forming a part of this carriage is a rack 55, the teeth of which mesh with the teeth of an arcuate rack 56 mounted for rocking movement upon a shaft 57. Rigidly coupled with the rack 56 is a fork 58, between the arms of which a traveler block 59 is disposed, which latter is connected in a manner hereinafter described with the carriages supporting the conveyors, so that as the fork is oscillated the carriages are reciprocated.

Thus, simultaneously with the driving of these conveyors, the carriages thereof will be given a movement longitudinally of the frame, and, due to the construction of the eccentrics or other mechanism utilized to produce this result, this movement will be a slow rearward one, i. e., from right to left, as in Figs. 1 and 2, and a rapid forward movement, i. e., from left to right, in the figures aforementioned. The speed of rotation of the sprockets 44 carried by the shaft 49 is such that the conveyor will move forwardly with respect to fixed parts of the machine frame during the rearward movements of the carriage. As a consequence, when the carriage suddenly reverses its movement and is rapidly advanced to its outermost position the speed of the conveyor with respect to the point aforementioned will be materially enhanced, and in fact, to an extent which will be equal to the speed of movement of the conveyor in addition to the speed of movement of the carriage, so that as a consequence, any pans or other elements supported by this conveyor will have a continuous movement toward the discharge end of the machine, which movement will be greatly accelerated for an instant, and will then continue with the same speed of movement as heretofore. Thus, presuming that the pan supported by the conveyor is being filled with cakes during the comparatively slow forward movement of the latter, and that the accelerating movement occurs when the pan has been filled to a point adjacent its rear edge, the filled pan will be quickly removed and an unfilled pan will have its forward end disposed virtually instantaneously adjacent the filling station. Even though the material which is to be disposed within the pans were being continuously discharged at the filling station, virtually none of this material would be wasted or distributed in the space extant between one of the pans or receptacles and the following receptacle.

However, in order to prevent even this wastage of material it will be noted in the present instance that the carriage which supports the conveyor 18 is coupled with the carriage supporting the conveyor 20. The speed of movement of the conveyor 18 is equal to the speed of movement of the conveyor 20, so that the pans will be properly filled with material. Thus the carriage provided by the rails 21 and bars 22 will move slowly rearwardly simultaneously with the rearward movement of the lower carriage, and at such a speed that the conveyor carried thereby will properly discharge material into the pans. When, however, the pan has been filled to the proper point and has its movement accelerated by the forward movement of the lower carriage, the upper carriage will also be moved forward rapidly and at a speed substantially equal to the speed of movement of the conveyor 18, so that the latter will not discharge any material during that interval of time when an unfilled pan is moved adjacent the filling station. This action will follow in that by having the conveyor 18 pass around the rollers 26 and 27 the discharge end of the conveyor may be advanced during the forward movement of the carriage a sufficient distance without it being necessary to depend upon the elasticity of the conveyor or some other undesirable mechanical expedient in order to permit of the result aforedescribed. Also due to the mechanism suggested, or a similar construction, the material to be placed within the pans may be discharged at an even rate, so that it is not necessary to interrupt the functions of the mechanism which operates upon this material.

It is preferred in the present instance to dispose the unfilled pans one after another within the machine, which pans at the proper instant will be automatically advanced in a correct manner. With this in mind a rest-bar 60 extends transversely of the deck 17 and over the conveyor 20. A guide-strip 61 is also arranged adjacent one of the edges of this conveyor, and what is herein termed a trigger mechanism is arranged to the rear of the bar 60 and spaced therefrom a distance equal to the length of a pan. This mechanism includes an angle-bar 62, rockingly supported as at 63 at a point above the conveyor 20, the movements of this bar beyond a proper point being prevented by means of a stop 64. Thus, an operator may place a pan upon the deck 17 with its rear edge resting upon the bar 60, its forward edge resting upon the trigger-bar 62, as has been indicated in dotted lines in Figs. 5 and 8, and the pan will be retained in this position.

In order to automatically—and at the proper moment—place the pan upon the conveyor 20, a trigger release is provided. This may include, as in the present exemplification, a sprocket-chain 65, which passes around a sprocket-wheel 66 mounted upon that shaft which mounts the sprocket-wheels 42, this chain also passing around a sprocket-wheel 67 carried by a bracket 68 adjacent the discharge end of the machine. The chain extends rearwardly to a point beyond the forward end of the pan, and at this point passes over a sprocket 69 mounted upon a bracket 70, as well as a sprocket 71 position adjacent the upper end of the same. At predetermined intervals the chain 65 carries actuating elements, in the present instance in the nature of rollers 72, which extend above its body sufficiently to establish contact with a lug 73 forming a part of the trigger proper. Thus, as in Fig. 5, if the chain is moved it will be obvious that the trigger will be thrown at predetermined intervals incident to one of the rollers 72 contacting with the lug 73, in that when this contact is established the trigger will be swung rearwardly, thus permitting the forward end of the pan supported thereby to drop upon the conveyor 20, the rear edge of the pan being engaged by a pair of the lugs 40 and pushed clear of the supporting bar 60, it being noted that for this purpose the latter is formed with notches 74, permitting of the passage of the lugs.

In operation, it will be appreciated that the cut dough or other material is carried upon the conveyor 18 and progresses with respect to a fixed point, despite the slow rearward movement of the carriage supporting the delivery end of this conveyor. Any surplus material which may exist is removed from the conveyor 18 by any suitable expedient, such as the conveyor 19, and the biscuits, crackers, etc. are carried by the conveyor 18 over the plate 24 and towards the discharge end of the latter. At this time an attendant places a pan so that it rests adjacent its rear edge upon the bar 60, and adjacent its forward edge upon the trigger 62. During this operation a pan supported by the conveyor 20 and in advance of the pan last mentioned is moving under the free edge of the blade 24 and is being filled with material in its passage thereunder. Prior to the complete filling of this pan the trigger release mechanism will be actuated so that the unfilled pan will immediately succeed the pan resting upon the conveyor 20, which latter is continuing to move forwardly in synchronism with the conveyor 18, despite the slow rearward movement of the carriage which supports the chains 37 and 38. The first pan will be filled at the time the cams move the traveler to move both carriages forwardly of the machine. As a consequence, upon one pan being filled to a proper extent its speed of movement will be suddenly accelerated, and the next succeeding empty pan will be brought to have its forward portion adjacent the delivery station within the shortest interval of time. During such forward moving of the second pan the material upon the conveyor 18 will not continue to be discharged, and this operation will be continuously repeated, it being of course appreciated that while the foregoing is occurring the attendant will place another empty pan in position.

In most instances it will be desired to provide positive acting means for the purpose of normally retaining the trigger mechanism in position and returning the same to this position. With this in mind, and as has been particularly shown in Figs. 4, 5 and 10, the shaft 63 carries an arm 90, one end of which is swingingly attached to the rod 91 of a spring barrel 92, the casing of the latter being attached as at 93 to the frame 15 of the machine. Thus, the member 64 will act as a stop for both the pan and trigger mechanism, which latter will be retained or immediately returned to the position shown in Fig. 5.

It will of course be understood that it may be desirable to provide adjustments, by means of which different errors and unexpected factors may be allowed for. With this in mind the sprocket 41 may be adjustably supported as at 75 and may be capable of being moved longitudinally of the machine frame so as to take up any slack in the conveyor 20. Likewise, the sprockets 70 and 71 may be adjusted by means of the mechanism indicated at 76 in order that the chain 65 may be properly tensioned. Furthermore, as has been particularly shown in Fig. 3, the connection extant between the blocks 59 and the forks 58 may be an adjustable one, by associating the former with screw-threaded adjusting shafts 77, and providing a common drive for both of these shafts. The block is secured to the lower carriage preferably by the use of a link 78, to one end of which it is connected, the opposite end of this link being attached to a block 79 mounted upon a rotatable and screw-threaded shaft 80, by means of which it may be moved longitudinally relatively to the machine, this shaft being attached to the frame of the pan conveyor carriage.

As aforestated, during the rapid forward movement of the pan conveyor, the material conveyor will not continue to discharge, and at this time it is to be noted that the plate 24 will be simultaneously moved upwardly so as to prevent any danger of a second and unfilled pan violently coming in contact with the material conveyor. This upward movement of the plate occurs incident to the fact that a striking member 81 is secured to the under side thereof and adjacent the outer end of the same, and is adapted to be engaged by the lugs 40. Thus, as the latter move forwardly the plate will be swung upwardly to permit of the ready passage of the forward end of an unfilled pan. Also, if desired, a brush 82 may be arranged to bear against the conveyor 18 adjacent the outer edge of the plate for the purpose of preventing any possibility of the material, incident to its inertia, being discharged from this conveyor when the supporting surface of the latter is extended or swung. The desirability of having the plate adjustable will now be apparent, in that by means of this expedient the tension upon the belt conveyor may at all times be properly maintained.

It will occur that the mechanism must be timed in order to have the material deposited upon the pans in exactly the manner desired. With this in mind the connection between the upper and lower carriages is preferably established by associating brackets 83 with the latter and connecting the inner ends of screw-threaded shafts 84 with the upper carriage. The threads of these shafts are engaged by similarly threaded collar members 85 forming a part of gears 86 mounted upon the brackets. These gears mesh with gears 87 carried by a shaft 88 extending transversely of the machine, and this latter shaft, by means of the hand-wheels 89, may be turned in order to move the carriages longitudinally relatively to each other to obtain the desired timing.

From the foregoing it will be apparent that the present invention contemplates a machine which is of particular value when utilized as a panskip mechanism, and that by means of this invention it is entirely practicable to have a continuously operating source of material supply, as well as mechanism which may be utilized to operate upon the material, but the discharge of the material will be interrupted at predetermined intervals. Furthermore, by means of the present invention the receptacles which are to receive the material are handled by means of a relatively simple mechanism, and their speed of movement is advanced at the proper instant in such a manner that a minimum of difficulty will be experienced in successfully operating the machine.

Also, it will be observed that the shaft 46, as in Fig. 1, extends into a casing, within which a change-speed mechanism is disposed. As a consequence, the speed of reciprocation of the carriages may be varied, and also, if desired, the speed of the conveyors relatively to each other may be changed. While this latter expedient may be accomplished in numerous different manners, it will be appreciated that the result is in most instances extremely desirable, so that the spacing of the material deposited within the receptacles may be varied, which is particularly advantageous, for example, incident to different sizes of crackers which may be handled by the machine.

Thus, among others, the objects specifically pointed out are accomplished, and since certain changes may be made in the above construction, and different embodiments of the invention could be made, without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A machine of the character described, including, in combination, a conveyor of the endless belt variety having a longitudinally extended supporting surface, means for advancing and retracting the forward end of said conveyor, said advancing movement being effected relatively rapidly in the direction in which said conveyor is moving, said retracting movement being relatively slow and in the other direction, a frame supporting a pan conveyor cooperatively disposed adjacent said forward end, and means for maintaining said forward end of the conveyor in fixed relation to said frame.

2. A machine of the character described, including, in combination, a carriage, a material-supporting conveyor associated with one part of said carriage, a receptacle-supporting conveyor associated with another portion of the same, means for driving said material conveyor to discharge material therefrom into the receptacles supported by the other conveyor, relatively fixed means for driving the latter conveyor, and means for periodically moving said carriage to vary the movement of said conveyors relatively to each other.

3. A machine of the character described, including, in combination, a carriage, a material-supporting conveyor associated with one part of said carriage, a receptacle-supporting conveyor associated with another portion of the same, means for driving said material conveyor to discharge material therefrom into the receptacles supported by the other conveyor, relatively fixed means for driving the latter conveyor, and means for moving said carriage longitudinally of said conveyors to substantially interrupt the discharge from the first conveyor and to simultaneously accelerate the movement of the pan conveyor.

4. A machine of the character described, including, in combination, a pair of conveyors, a carriage for each of the same, means for moving said conveyors, means for reciprocating said carriages, and means for shifting one of said carriages relatively to the other.

5. A machine of the character described, including, in combination, a pair of conveyors, a carriage supporting the same, means for moving said conveyors and carriages, and means for shifting one of said carriages relatively to the other and in the direction of movement thereof.

6. A machine of the character described, including, in combination, a pair of conveyors, a carriage supporting the same, means for moving said conveyors, a frame supporting said carriage, means for moving said carriage relatively to said frame, and means for varying the amount of such movement.

7. A machine of the class described, including a frame, a pair of carriages mounted on said frame, cooperating conveyors supported one by each of said carriages, means for driving said conveyors with respect to said carriages, and means for reciprocating said carriages with respect to said frame.

8. A machine of the class described, including a frame, a pair of carriages mounted on said frame, cooperating conveyors supported one by each of said carriages, means for driving said conveyors with respect to said carriages, means for reciprocating one of said carriages with respect to said frame, and means connecting said carriage to the other to move the latter in synchronism therewith.

9. A machine of the class described, including a frame, a pair of carriages mounted on said frame, cooperating conveyors supported one by each of said carriages, means for driving said conveyors with respect to said carriages, means for reciprocating said carriages with respect to said frame, and means for adjusting the position of one of the carriages relatively to the other.

10. A machine of the class described, including a frame, a pair of carriages mounted on said frame, cooperating conveyors supported one by each of said carriages, means for driving said conveyors with respect to said carriages, means for reciprocating said carriages with respect to said frame, and means for shifting one of said carriages with respect to the other during the reciprocation of both of the same.

11. A machine of the class described, including a frame, a pair of carriages mounted for reciprocation within said frame, conveyors supported by each of said carriages, means for driving said conveyors, means for reciprocating one of said carriages, a bracket associated with one of said carriages, and means for adjustably connecting said bracket with the second of said carriages whereby the latter will be reciprocated in synchronism with the former.

12. A machine of the class described, including a frame, a pair of carriages mounted for reciprocation within said frame, conveyors supported by each of said carriages, reciprocating driving means, means for adjustably connecting one of said carriages with said driving means, and means for connecting the second carriage with the first carriage.

13. A machine of the class described, including a frame, a pair of carriages mounted for reciprocation within said frame, conveyors supported by each of said carriages, reciprocating driving means, means for connecting one of said carriages with said driving means, means for varying the amount of reciprocation imparted to said carriage, and means for connecting the second carriage with the first carriage to move in unison therewith.

14. A machine of the class described, including a frame, a pair of carriages mounted for reciprocation within said frame, conveyors supported by each of said carriages, reciprocating driving means, means for adjustably connecting one of said carriages with said driving means, means for varying the amount of reciprocation imparted to said carriage, and means for adjustably connecting the second carriage to the first carriage whereby normally both carriages will be reciprocated in unison, and the second carriage may be shifted with respect to the first carriage.

15. A machine of the class described, including a carriage, a conveyor associated therewith, a panner-blade rockingly mounted upon said carriage and extending therefrom, said blade supporting said conveyor adjacent the delivery end of the same, a pan conveyor below said first conveyor, means for driving both of said conveyors, lugs associated with said pan conveyor, and means connected with said panner-blade and to be engaged by said lugs whereby to shift the end of the conveyor carried thereby.

16. A machine of the class described, including a frame, a conveyor mounted for movement within said frame, supporting members for receiving a pan to be positioned upon said conveyor, one of said members being shiftable, a chain, tripping elements associated with said chain and engaging said shiftable member to deposit the pan upon said conveyor, and means for driving said chain.

17. A machine of the class described, including a frame, a pair of carriages mounted for reciprocation within said frame, means for connecting said carriages to move in unison, means connected with one of said carriages for reciprocating the same, conveyors associated with each of said carriages, a rotatable shaft secured to said frame, means for driving said shaft, and conveyor-engaging and-driving members secured to said shaft.

18. A machine of the class described, including a frame, carriages mounted for reciprocation within said frame, means connecting said carriages whereby the same may move in unison, conveyors associated with each of said carriages, means operating said conveyors, and means connected with one of said carriages for moving the same rapidly toward the forward end of said machine and returning the same relatively slowly to its initial position.

19. In a machine of the character described, the combination comprising an apron constructed and arranged to provide an alternately advancing and retreating delivery point for periodically delivering batches of articles from said apron, a carrier having receiving means for receiving said periodically delivered batches from said apron, means for moving said carrier at alternate different speeds in the same cycle as the reciprocation of the delivery point, a cam for controlling and coordinating the reciprocations of said delivery point and the periodic speed changes of said carrier and means connecting said delivery point and carrier to cause them to reciprocate together.

20. In a machine of the character described, the combination comprising a panner blade mounted for advancing and retreating movement for periodically delivering batches of articles, a pan carrier for receiving said batches, means for moving said pan carrier at alternate different speeds synchronously with said panner blade reciprocations, and means for controlling the panner blade reciprocation and said carrier speed changes, said means being constructed and arranged to advance said panner blade at a different speed than its retreating speed and means connecting said delivery point and carrier to cause them to move together.

21. In a machine of the class described, an endless dough apron, a reciprocatable carriage having a panner blade cooperating with the forward end of said apron, a second reciprocatable carriage supporting a pan carrier below said apron and panner blade, a single means for reciprocating said carriages, and means for continuously driving said apron and carrier.

22. In a machine of the class described, a frame, an endless dough apron and a reciprocatable panner blade mounted on said frame, said apron at its forward end passing around said panner blade, an endless pan carrier below said panner blade and means for driving it continuously, means for reciprocating the upper run of said pan carrier, and a positive connection between said reciprocating means and panner blade for reciprocating said carrier and blade in unison.

23. In a machine of the class described, a frame, an endless dough apron and a reciprocatable panner blade mounted on said frame, said apron at its forward end passing around said panner blade, an endless pan carrier below said panner blade and means for driving it continuously, means for reciprocating the upper run of said pan carrier, a positive connection between said reciprocating means and panner blade for reciprocating said carrier and blade in unison, means for adjusting the amplitude of said reciprocating means, and means for adjusting the relative positions of said panner blade and carrier.

24. In a machine of the character described, the combination comprising a panner blade mounted for advancing and retreating movement for periodically delivering batches of articles, a carrier for receiving said batches, means for advancing said panner blade at a different speed from its retreating speed, means for supporting said carrier, and means for connecting said carrier supporting means with said panner blade whereby said carrier supporting means will move in unison with said panner blade.

In testimony whereof I affix my signature.

HARRY A. GREENHOLT.